(12) United States Patent
Fukui

(10) Patent No.: US 8,490,918 B2
(45) Date of Patent: Jul. 23, 2013

(54) HYDRAULIC APPARATUS FOR AIRCRAFT ACTUATORS

(75) Inventor: Atsushi Fukui, Gifu (JP)

(73) Assignee: Nabtesco Corporation (JP)

( * ) Notice: Subject to any disclaimer, the term of this patent is extended or adjusted under 35 U.S.C. 154(b) by 171 days.

(21) Appl. No.: 13/104,691

(22) Filed: May 10, 2011

(65) Prior Publication Data
US 2011/0278392 A1 Nov. 17, 2011

(30) Foreign Application Priority Data
May 13, 2010 (JP) ................................. 2010-111095

(51) Int. Cl.
*B64C 5/10* (2006.01)

(52) U.S. Cl.
USPC ......................... 244/99.6; 244/99.5; 244/99.2

(58) Field of Classification Search
USPC ................. 244/99.6, 99.5, 99.2, 213; 60/405, 60/592
See application file for complete search history.

(56) References Cited

U.S. PATENT DOCUMENTS

| | | | | |
|---|---|---|---|---|
| 3,347,495 | A * | 10/1967 | Eberhardt et al. | 244/207 |
| 5,109,672 | A * | 5/1992 | Chenoweth et al. | 60/456 |
| 7,600,715 | B2 * | 10/2009 | Matsui | 244/99.6 |
| 7,870,726 | B2 * | 1/2011 | Matsui | 60/405 |
| 8,191,824 | B2 * | 6/2012 | Shaheen et al. | 244/76 A |
| 2003/0226467 | A1 * | 12/2003 | Nardone et al. | 102/489 |
| 2006/0226285 | A1 * | 10/2006 | Matsui | 244/99.6 |
| 2009/0084890 | A1 * | 4/2009 | Reinhardt | 244/12.4 |
| 2009/0266934 | A1 * | 10/2009 | Makino | 244/99.5 |
| 2011/0051127 | A1 * | 3/2011 | Kusaka et al. | 356/128 |
| 2011/0068221 | A1 * | 3/2011 | Recksiek et al. | 244/99.5 |
| 2011/0256000 | A1 * | 10/2011 | Fukui | 417/213 |
| 2011/0264242 | A1 * | 10/2011 | Nakagawa et al. | 700/21 |
| 2011/0266390 | A1 * | 11/2011 | Nakagawa et al. | 244/99.5 |
| 2012/0001021 | A1 * | 1/2012 | Fukui | 244/99.6 |
| 2012/0029859 | A1 * | 2/2012 | Fukui et al. | 702/114 |
| 2012/0032026 | A1 * | 2/2012 | Becker et al. | 244/118.5 |
| 2012/0085860 | A1 * | 4/2012 | Nakagawa et al. | 244/99.4 |
| 2012/0131912 | A1 * | 5/2012 | Fukui et al. | 60/405 |
| 2012/0273613 | A1 * | 11/2012 | Ulbrich-Gasparevic et al. | 244/118.1 |

FOREIGN PATENT DOCUMENTS

JP 2007-046790 A 2/2007

\* cited by examiner

*Primary Examiner* — Timothy D Collins
*Assistant Examiner* — Medhat Badawi
(74) *Attorney, Agent, or Firm* — Studebaker & Brackett PC

(57) ABSTRACT

A pump unit installed inside a wing includes a backup hydraulic pump that can supply pressure oil to an actuator when a loss or reduction occurs in the function of an aircraft central hydraulic power source and an electric motor that drives the pump. A wing structure portion forming the surface structure of the wing is provided with an inlet port and an exhaust port that are formed therethrough. The inlet port is provided so as to be opened and closed by an inlet port opening/closing portion, and the exhaust port is provided so as to be opened and closed by an exhaust port opening/closing portion.

7 Claims, 8 Drawing Sheets

HYDRAULIC APPARATUS FOR AIRCRAFT ACTUATORS

CROSS-REFERENCE TO RELATED APPLICATIONS

This application claims priority to Japanese Patent Application No. 2010-111095. The entire disclosure of Japanese Patent Application No. 2010-111095 is hereby incorporated herein by reference.

BACKGROUND OF THE INVENTION

1. Field of the Invention

The present invention relates to a hydraulic apparatus for aircraft actuators that supplies pressure oil to a hydraulically-operated actuator for driving a control surface of an aircraft.

2. Description of Related Art

An aircraft is provided with control surfaces that are formed as moving surfaces (flight control surfaces) and are configured as an aileron, an elevator, and the like. A hydraulically-operated actuator is often used as an actuator for driving such control surfaces. Further, pressure oil is supplied to such an actuator from an aircraft central hydraulic power source. However, a loss or reduction in the function (pressure oil supply function) of the aircraft central hydraulic power source may occur. To address this problem, JP 2007-46790A discloses a hydraulic apparatus (hydraulic apparatus for aircraft actuators) that can supply pressure oil to an actuator even if a loss or reduction in the function of the aircraft central hydraulic power source occurs.

The hydraulic apparatus for aircraft actuators that is disclosed in JP 2007-46790A includes a pump and an electric motor that are provided independently of the aircraft central hydraulic power source. The pump is provided so as to raise the pressure of pressure oil that is discharged from the actuator and to supply the pressure oil to the actuator. The electric motor is configured to drive the pump when the aircraft central hydraulic power source undergoes a pressure decrease and a loss or reduction in its function occurs.

SUMMARY OF THE INVENTION

Even if a loss or reduction in the function of the aircraft central hydraulic power source occurs, the actuator can be driven by operating a hydraulic apparatus for aircraft actuators as disclosed in JP 2007-46790A. However, in the case of a loss or reduction in f the function of the aircraft central hydraulic power source, the above-described hydraulic apparatus is continuously running. This tends to cause an increase in the temperature of the pump and the electric motor of the hydraulic apparatus, and also tends to cause an increase in the temperature of the oil (working fluid) that is supplied as the pressure oil from the hydraulic apparatus to the actuator and that is circulated between the hydraulic apparatus and the actuator. Accordingly, there is a significant constraint on the continuous running time and the time for oil replacement associated with oil degradation.

Furthermore, a further reduction in the weight of aircrafts is required in recent years, and therefore the size reduction and the weight reduction are also needed to be realized for the above-described hydraulic apparatus. For this reason, it is desired that the hydraulic apparatus is installed in an area closer to the actuator inside the wings. In this case, as the temperature of the hydraulic apparatus and the oil used increases, the temperature of the air inside the wings also tends to increase, which may accelerate the increase in the temperature of the hydraulic apparatus and the oil. From the viewpoint of the demand for a further reduction in the weight of aircrafts, there is a trend in recent years toward more frequent use of fiber reinforced plastics, which is a composite material, as the material for forming aircraft wings. For this reason, if the hydraulic apparatus is installed inside the wing, there is the possibility that the increase in the temperature of the air inside the wing made of fiber reinforced plastics, which have high thermal insulation performance, may be further accelerated, with an increase in the temperature of the hydraulic apparatus and the oil used. Although the heat generated in the hydraulic apparatus can be easily released to the outside of the wings when aluminum, which is excellent in thermal conduction, is used as the material of the wings as in conventional aircraft, it is difficult to expect a sufficient heat release effect to be achieved with the wings made of fiber reinforced plastics, which have low thermal conductivity.

In view of the foregoing circumstances, it is an object of the present invention to provide a hydraulic apparatus for aircraft actuators that can drive the actuator even in the case of a loss or reduction in the function of the aircraft central hydraulic power source, can realize a reduction in size and weight of the configuration of the apparatus, and can suppress an increase in the temperature of the apparatus and the oil used.

According to a first feature of a hydraulic apparatus for aircraft actuators of the present invention for achieving the above-described object, there is provided a hydraulic apparatus for aircraft actuators that supplies pressure oil to a hydraulically-operated actuator for driving a control surface of an aircraft, the apparatus including: a pump unit installed inside a wing of the aircraft; an inlet port that is provided as a hole formed through a wing structure portion forming a surface structure of the wing and that can supply air outside the wing into the wing; an exhaust port that is provided as a hole formed through the wing structure portion and that can discharge air inside the wing to the outside of the wing; an inlet port opening/closing portion that is provided in the wing structure portion, whose position can be switched between a position to open the inside of the wing to the outside and a position to close the inside of the wing from the outside, and that can open and close the inlet port; and an exhaust port opening/closing portion that is provided in the wing structure portion, whose position can be switched between a position to open the inside of the wing to the outside and a position to close the inside of the wing from the outside, and that can open and close the exhaust port, wherein the pump unit includes a backup hydraulic pump that can supply pressure oil to the actuator when a loss or reduction occurs in a function of an aircraft central hydraulic power source and an electric motor that drives the backup hydraulic pump.

With this configuration, even if a loss or reduction in the function of the aircraft central hydraulic power sources occurs, the actuator can be driven by the pressure oil being supplied from the backup hydraulic pump of the pump unit installed inside the wing. Since the pump unit is installed inside the wing, it is possible to realize the size reduction and the weight reduction for the hydraulic apparatus for aircraft actuators (hereinafter, also simply referred to as the "hydraulic apparatus"). Moreover, with the hydraulic apparatus having this configuration, the inlet port opening/closing portion and the exhaust port opening/closing portion operate to open the inlet port and the exhaust port, thus making it possible to supply the low-temperature air outside the wing into the wing and discharge the high-temperature air inside the wing to the outside of the wing. Accordingly, the heat generated from the backup hydraulic pump and the electric motor of the hydraulic apparatus can be removed by the air flowing in from the inlet port to the exhaust port, and thereby the hydraulic apparatus is cooled. That is, the heat generated in the hydraulic apparatus can be released directly to the atmosphere outside the wing. Furthermore, this also makes it possible to utilize the cooling function of the oil used in the hydraulic apparatus, thus suppressing an increase in the oil temperature.

Therefore, with this configuration, it is possible to provide a hydraulic apparatus for aircraft actuators that can drive the actuator even in the case of a loss or reduction in the function of the aircraft central hydraulic power sources, can realize a reduction in size and weight of the configuration of the apparatus, and can suppress an increase in the temperature of the apparatus and the oil used.

According to a second feature of a hydraulic apparatus for aircraft actuators of the present invention, in the hydraulic apparatus for aircraft actuators having the first feature, the inlet port is on an undersurface side of the wing and the exhaust port is on a top surface side of the wing.

With this configuration, the inlet port is on the undersurface side, which is the high-pressure side in the wing, and the exhaust port is on the top surface side, which is the low-pressure side. Accordingly, by opening the inlet port and the exhaust port, the air flows of the outside air flowing into the wing from the inlet port, which is the high-pressure side, and of the air inside the wing flowing out from the exhaust port, which is the low pressure side, can be easily formed. Consequently, the heat generated in the hydraulic apparatus can be efficiently released to the atmosphere outside the wing.

According to a third feature of a hydraulic apparatus for aircraft actuators of the present invention, the hydraulic apparatus for aircraft actuators having the first feature further includes: an inlet-side drive mechanism that drives the inlet port opening/closing portion to be opened and closed, wherein the inlet port opening/closing portion includes a first lid member that covers the inlet port, and the inlet-side drive mechanism drives the inlet port opening/closing portion to be opened and closed by causing the first lid member to slidably move along the wing structure portion.

With this configuration, the first lid member that covers the inlet port at the inlet port opening/closing portion is driven by the inlet-side drive mechanism to slidably move along the wing structure portion, and thereby the inlet port is opened or closed. Accordingly, the direction of movement of the first lid member for opening and closing the inlet port is a direction along the plane direction of the first lid member, and it is therefore possible to prevent the first lid member from being opened and closed in a direction against the inflow direction of the outside air flowing into the wing via the inlet port. Thus, it is possible to reduce the air resistance that acts to prevent the movement of the first lid member during opening and closing of the inlet port. This makes it possible to achieve an inlet port opening/closing portion and an inlet-side drive mechanism that facilitate the opening/closing operation of the inlet port.

According to a fourth feature of a hydraulic apparatus for aircraft actuators of the present invention, the hydraulic apparatus for aircraft actuators having the first feature further includes: an inlet-side drive mechanism that drives the inlet port opening/closing portion to be opened and closed, wherein the inlet port opening/closing portion includes a second lid member that is installed so as to be pivotable via a rotating shaft in the wing structure portion, and that covers the inlet port, and the inlet-side drive mechanism drives the second lid member so as to be opened toward a front side in a flight direction of the aircraft.

With this configuration, the second lid member that covers the inlet port at the inlet port opening/closing portion is driven by the inlet-side drive mechanism to be opened toward the front side in the flight direction of the aircraft. Accordingly, the air can be easily flowed in from the inlet port from the front side in the flight direction along the flow of the air in the vicinity of the wing. This makes it possible to achieve an inlet port opening/closing portion and an inlet-side drive mechanism that can supply the low-temperature atmosphere outside the wing into the wing via the inlet port efficiently.

According to a fifth feature of a hydraulic apparatus for aircraft actuators of the present invention, the hydraulic apparatus for aircraft actuators having the first feature further includes: an inlet-side drive mechanism that drives the inlet port opening/closing portion to be opened and closed; and an exhaust-side drive mechanism that drives the exhaust port opening/closing portion to be opened and closed, wherein the electric motor, the inlet-side drive mechanism, and the exhaust-side drive mechanism operate in accordance with a command signal from a control surface control apparatus that controls operation of the control surface.

With this configuration, the electric motor of the pump unit, the inlet-side drive mechanism that drives the inlet port opening/closing portion to be opened and closed, and the exhaust-side drive mechanism that drives the exhaust port opening/closing portion to be opened and closed operate in accordance with command signals from the control surface control apparatus that controls the operation of the control surface via the actuator for driving the control surface. Accordingly, it is possible, by effectively utilizing the control surface control apparatus, to achieve a control configuration that can activate the pump unit in response to the operation status of the actuator for driving the control surface and can open the inlet port and the exhaust port, without adding an extra control apparatus.

According to a sixth feature of a hydraulic apparatus for aircraft actuators of the present invention, in the hydraulic apparatus for aircraft actuators having the first feature, the inlet port and the exhaust port are opened by the inlet port opening/closing portion and the exhaust port opening/closing portion operating at a timing at which the backup hydraulic pump is activated.

With this configuration, the inlet port and the exhaust port are opened at the timing at which the backup hydraulic pump is activated. Therefore, the heat generated in the hydraulic apparatus can be quickly released to the atmosphere outside the wing. During a normal flight in which the hydraulic apparatus is not in operation, the inlet port and the exhaust port will not be opened, and it is therefore possible to prevent the air outside the wing from flowing into the wing and thus causing a reduction in the wing efficiency.

According to a seventh feature of a hydraulic apparatus for aircraft actuators of the present invention, the hydraulic apparatus for aircraft actuators having the first feature further includes: a temperature sensor that detects at least one of a temperature of the pump unit, a temperature of air inside the wing, and a temperature of oil used as pressure oil supplied from the backup hydraulic pump, wherein the inlet port and the exhaust port are opened by the inlet port opening/closing portion and the exhaust port opening/closing portion operating in accordance with a result of detection performed by the temperature sensor.

With this configuration, at least one of the temperature of the pump unit, the temperature of the air inside the wing, and the oil temperature is detected by the temperature sensor, and the inlet port and the exhaust port are opened in accordance with a result of the detection. Therefore, the inlet port and the exhaust port can be efficiently opened at the timing at which the temperature of the hydraulic apparatus or the oil used has increased, and the heat generated in the hydraulic apparatus can be quickly released to the atmosphere outside the wing. It is therefore possible to prevent the air outside the wing from flowing into the wing and thus causing a reduction in the wing efficiency, in a state where the temperature of the hydraulic apparatus or the oil used has not increased.

It should be appreciated that the above and other objects, and features and advantages of the present invention will become apparent from the following description taken in conjunction with the accompanying drawings.

DETAILED DESCRIPTION OF THE INVENTION

Figure 1:
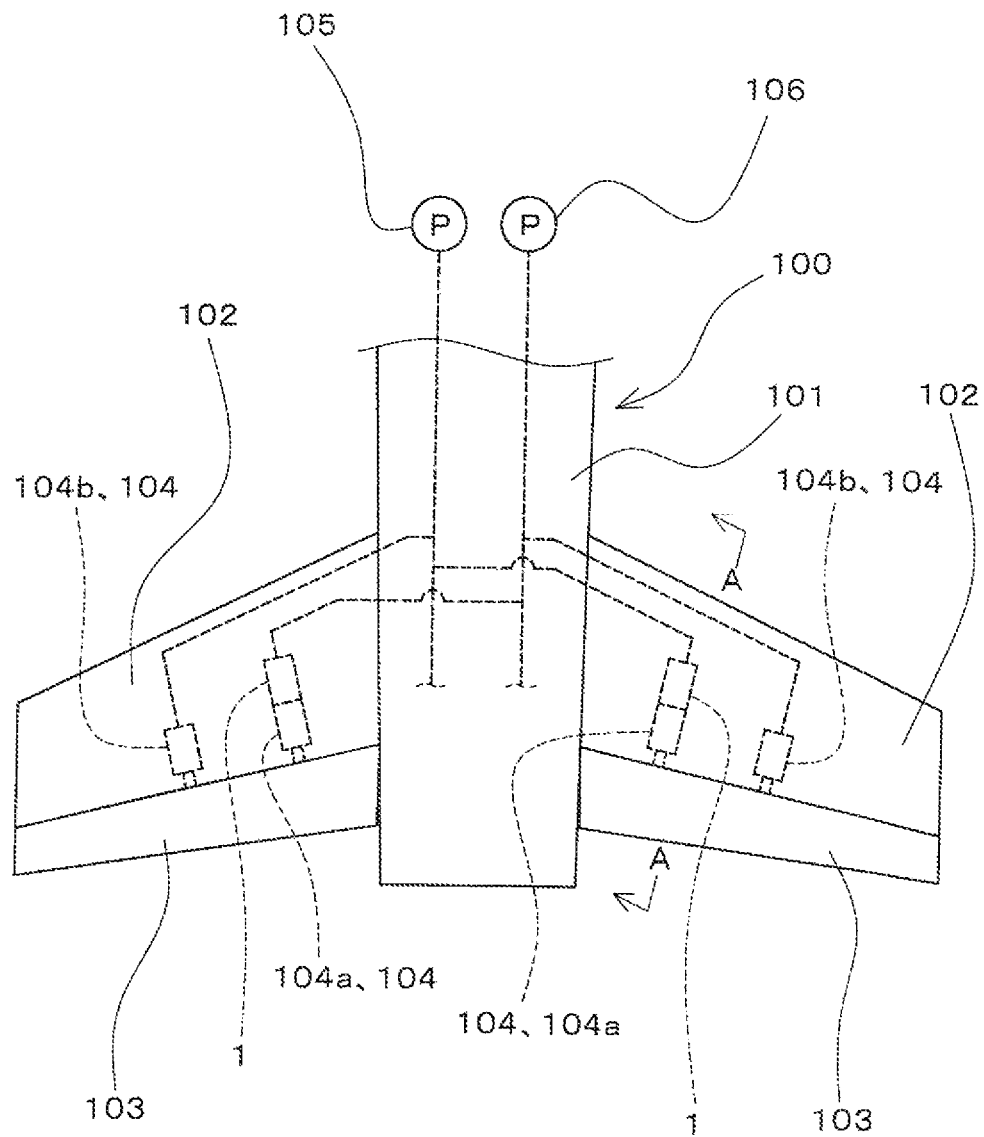
FIG. 1 is a diagram schematically showing part of an aircraft to which a hydraulic apparatus for aircraft actuators according to a first embodiment of the present invention is applied.

Hereinafter, embodiments for carrying out the present invention will be described with reference to the accompanying drawings. It should be appreciated that embodiments of the present invention can be widely applied as a hydraulic apparatus for aircraft actuators that supplies pressure oil to a hydraulically-operated actuator for driving an aircraft control surface.
First Embodiment FIG. 1 is a diagram schematically showing part of an aircraft 100 to which a hydraulic apparatus 1 for aircraft actuators (hereinafter, also simply referred to as a "hydraulic apparatus 1") according to a first embodiment of the present invention is applied, showing a rear part of a body 101 of the aircraft 100 and a pair of tailplanes (102). In FIG. 1, illustration of a vertical tail at the rear part of the body 101 is omitted.

Each of the two tailplanes (102, 102) is provided with an elevator 103 as a moving surface (flight control surface) constituting a control surface of the aircraft 100. The elevator 103 of each tailplane 102 is configured to be driven by a plurality of (for example, two) actuators 104 (104a, 104b), as illustrated in FIG. 1. Actuators (104a, 104b) for driving elevators 103 and a hydraulic apparatus 1 configured to supply pressure oil to one of the actuators, namely the actuator 104a, are installed inside each tailplane 102.

Note that the actuators (104a, 104b) and the hydraulic apparatuses 1 that are respectively installed in the pair of tailplanes (102) are configured in the same manner. Therefore, in the following description, the actuators (104a, 104b) and the hydraulic apparatus 1 that are installed in one of the tailplanes 102 will be described. The description of the actuators (104a, 104b) and the hydraulic apparatus 1 installed in the other tailplane 102 is omitted.

Figure 2:
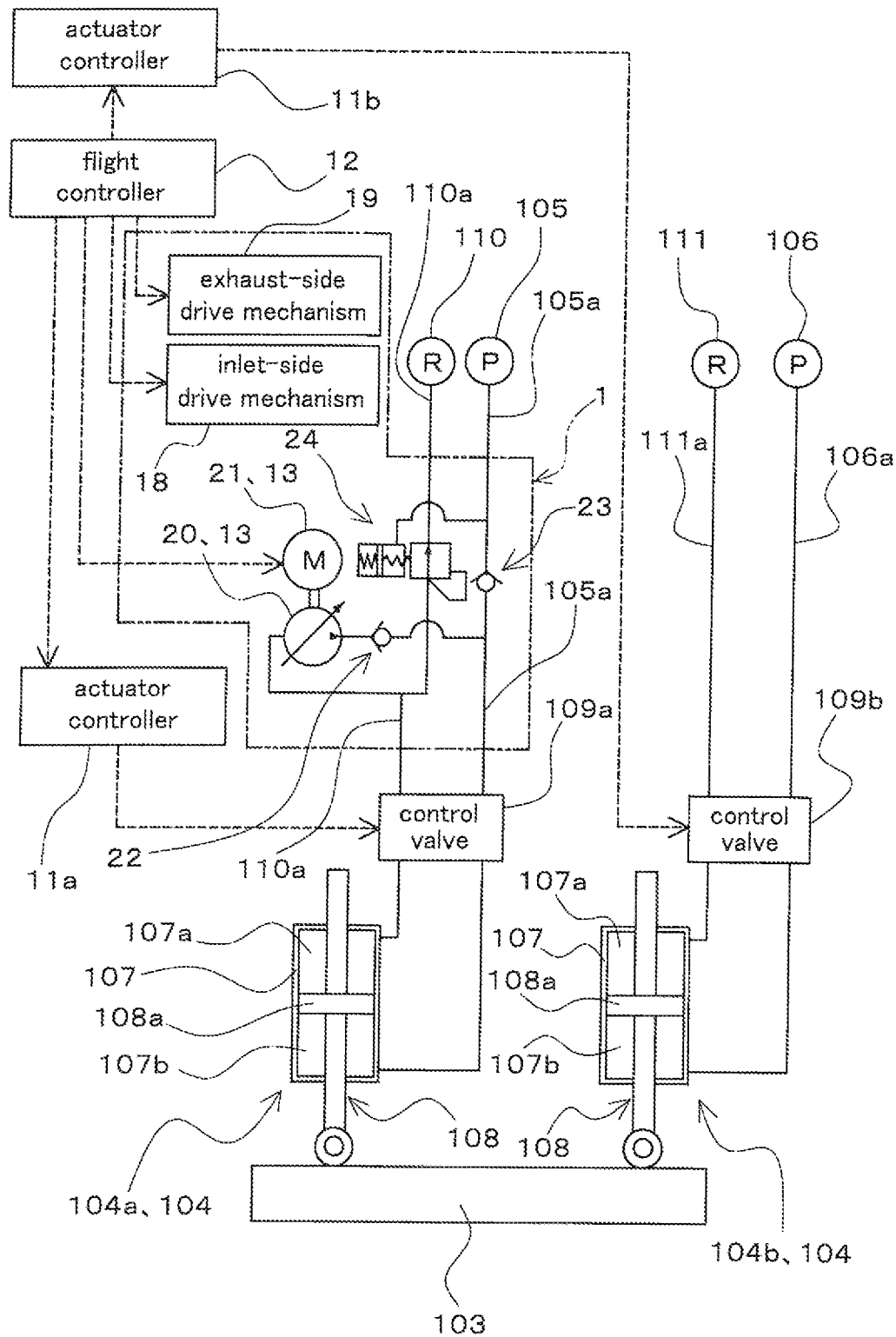
FIG. 2 is a hydraulic circuit diagram schematically showing a hydraulic circuit including a hydraulic apparatus for aircraft actuators and actuators as shown in FIG. 1.

FIG. 2 is a hydraulic circuit diagram schematically showing a hydraulic circuit including the actuators (104a, 104b) for driving an elevator 103 provided in one of the tailplanes 102 and a hydraulic apparatus 1 configured to supply pressure oil to one of the actuators, namely the actuator 104a. Each of the actuators (104a, 104b) includes, for example, a cylinder 107 and a rod 108 provided with a piston 108a, with the interior of the cylinder 107 divided into two oil chambers (107a, 107b) by the piston 108a. Also, each of the oil chambers (107a, 107b) in the cylinder 107 of the actuator 104a is configured to be in communication with a first aircraft central hydraulic power source 105 and a reservoir circuit 110 via a control valve 109a. On the other hand, each of the oil chambers (107a, 107b) in the cylinder 107 of the actuator 104b is configured to be in communication with a second aircraft central hydraulic power source 106 and a reservoir circuit 111 via a control valve 109b.

The first aircraft central hydraulic power source 105 and the second aircraft central hydraulic power source 106 each include a hydraulic pump that supplies pressure oil, and are installed on the body 101 side (inside the body 101) as systems that are independent of each other. Also, the first and second aircraft central hydraulic power sources (105, 106) are each provided as an aircraft central hydraulic power source, which is a hydraulic power source that supplies pressure oil to the actuators 104 for driving the elevator 103 and actuators (not shown) for driving control surfaces other than the elevator 103. Further, the first aircraft central hydraulic power source 105 is connected with the actuators 104 so as to be able to supply pressure oil to the actuator 104a installed in one of the tailplanes 102 and the actuator 104b installed in the other tailplane 102. On the other hand, the second aircraft central hydraulic power source 106 is connected with the actuators 104 so as to be able to supply pressure oil to the actuator 104b installed in one of the tailplanes 102 and the actuator 104a installed in the other tailplane 102.

The reservoir circuit 110 includes a tank (not shown) into which oil (working fluid) that is supplied as pressure oil and is thereafter discharged from the actuators 104 flows back, and the reservoir circuit 110 is configured to be in communication with the first aircraft central hydraulic power source 105. The reservoir circuit 111 that is configured as a system independent of the reservoir circuit 110 includes a tank (not shown) into which oil (working fluid) that is supplied as pressure oil and is thereafter discharged from the actuators 104 flows back, and the reservoir circuit 111 is configured to be in communication with the second aircraft central hydraulic power source 106 that is configured as a system independent of the first aircraft central hydraulic power source 105. Note that the reservoir circuit 110 is connected with the actuator 104a installed in one of the tailplanes 102 and the actuator 104b installed in the other tailplane 102, and is also connected with the first aircraft central hydraulic power source 105. Consequently, the pressure of the oil that has returned to the reservoir circuit 110 is raised by the first aircraft central hydraulic power source 105 and is supplied to predetermined actuators 104. On the other hand, the reservoir circuit 111 is connected with the actuator 104b installed in one of the tailplanes 102 and the actuator 104a installed in the other tailplane 102, and is also connected with the second aircraft central hydraulic power source 106. Consequently, the pressure of the oil that has returned to the reservoir circuit 111 is raised by the second aircraft central hydraulic power source 106 and is supplied to predetermined actuators 104.

The control valve 109a is provided as a valve mechanism that switches the state of connection of the oil chambers (107a, 107b) with a supply passage 105a in communication with the first aircraft central hydraulic power source 105 and an exhaust passage 110a in communication with the reservoir circuit 110. The control valve 109b is provided as a valve mechanism that switches the state of connection of the oil chambers (107a, 107b) with a supply passage 106a in communication with the second aircraft central hydraulic power source 106 and an exhaust passage 111a in communication with the reservoir circuit 111. The control valve 109a may be configured, for example, as an electromagnetic switching valve, and may be driven in accordance with a command signal from an actuator controller 11a that controls operation of the actuator 104a. The control valve 109b may be configured, for example, as an electromagnetic switching valve, and may be driven in accordance with a command signal from an actuator controller 11b that controls operation of the actuator 104b.

The above-described actuator controller 11a controls the actuator 104a in accordance with a command signal from a flight controller 12 serving as a superordinate computer that commands operation of the elevator 103. The actuator controller 11b controls the actuator 104b in accordance with a command signal from the flight controller 12. The flight controller 12 may include, for example, a CPU (Central Processing Unit), a memory, an interface and the like, which are not shown, and constitutes a control surface control apparatus of this embodiment that controls the operation of the elevator 103, which is shown as an example of the control surface in this embodiment, via the actuator controller 11a and the actuator controller 11b.

In addition, the actuator controller 11a and the actuator controller 11b may be installed, for example, as controllers of a centralized control system, or controllers of a distributed processing system. In the case of the centralized control system, the actuator controller 11a and the actuator controller 11b are installed in a single casing (not shown) installed on the body 101 side, and the system is configured such that the actuator controller 11a controls the actuator 104a and the actuator controller 11b controls the actuator 104b. In the case of the distributed processing system, the actuator controller 11a is installed in a casing (not shown) mounted to the actuator 104a and the actuator controller 11b is installed in a casing (not shown) mounted to the actuator 104b, and the system is configured such that the actuator controller 11a controls the actuator 104a and the actuator controller 11b controls the actuator 104b. Although this embodiment has been described taking, as an example, a configuration in which command signals from a single flight controller 12 are input into a plurality of different actuator controllers (11a, 11b), this need not be the case. For example, it is possible to adopt a configuration in which a plurality of command signals from different flight controllers are respectively input into different actuator controllers (11a, 11b).

Further, the above-described control valve 109a is switched in accordance with a command from the actuator controller 11a, and thereby pressure oil is supplied from the supply passage 105a to one of the oil chambers (107a, 107b) and the oil is discharged from the other of the oil chambers (107a, 107b) to the exhaust passage 110a. Consequently, the rod 108 is displaced relative to the cylinder 107, thus driving the elevator 103. Although not shown, a mode switching valve that switches the state (mode) of communication between the oil chambers (107a, 107b) is provided between the control valve 109a and the actuator 104a. Note that the control valve 109b is configured in the same manner as the control valve 109a described above, and therefore the description thereof is omitted.

Next, the hydraulic apparatus 1 according to this embodiment will be described in detail. The hydraulic apparatus 1 shown in FIGS. 1 and 2 is configured to supply pressure oil to the hydraulically-operated actuator 104a for driving the elevator 103. Although this embodiment has been described, taking, as an example, a case where the hydraulic apparatus 1 supplies pressure oil to the actuator 104a for driving a control surface configured as the elevator 103, this need not be the case. That is, the hydraulic apparatus 1 may be used as a hydraulic apparatus that supplies pressure oil to an actuator for driving a control surface other than an elevator, such as an aileron.

Figure 3:
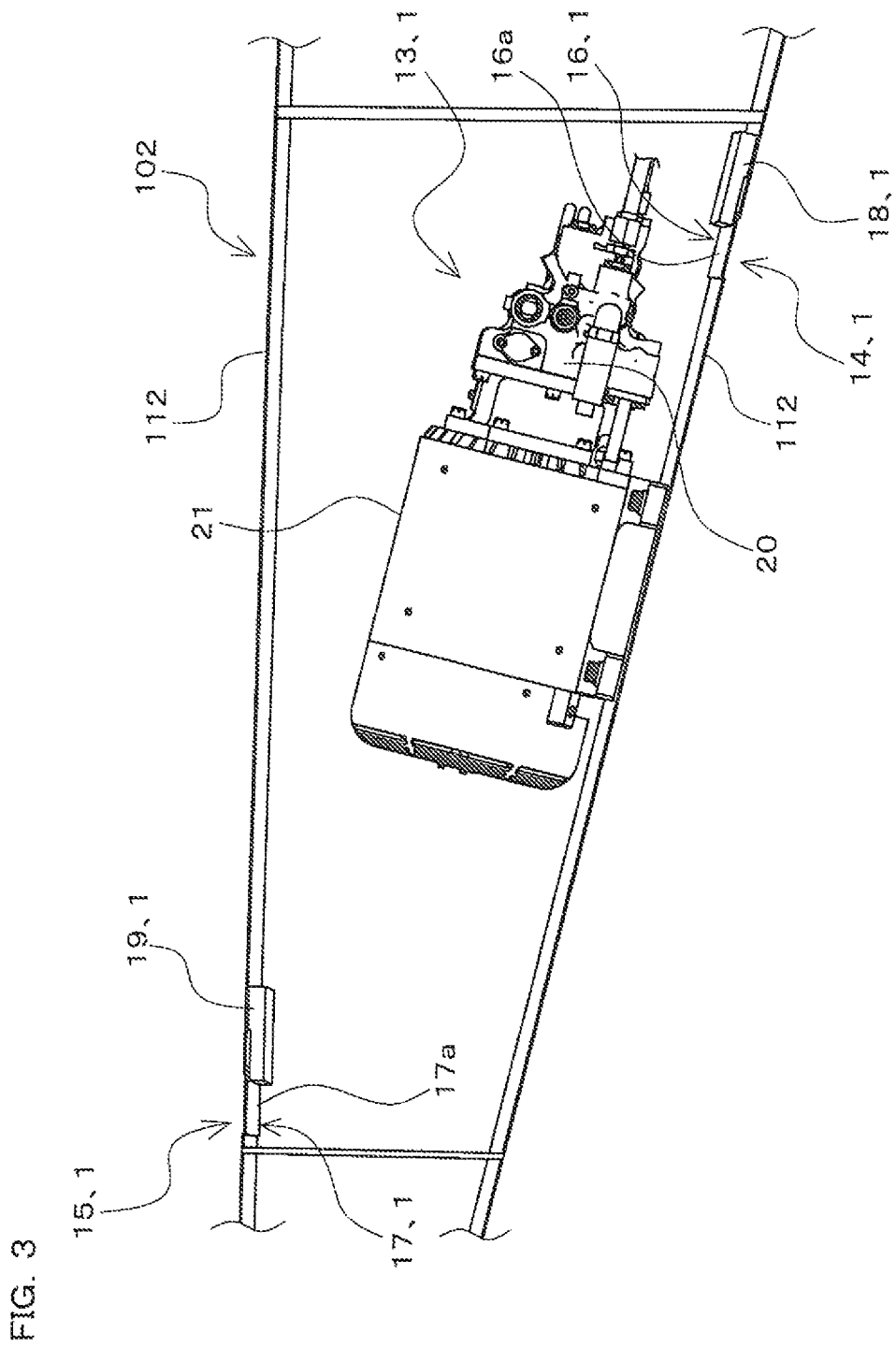
FIG. 3 is a diagram showing the hydraulic apparatus for aircraft actuators shown in FIG. 1 together with part of a wing, as viewed from the position of the arrows A-A.

FIG. 3 is a diagram showing the hydraulic apparatus 1 together with part of the tailplane 102, as viewed from the position of the arrows A-A in FIG. 1. The hydraulic apparatus 1 shown in FIGS. 1 to 3 includes a pump unit 13, an inlet port 14, an exhaust port 15, an inlet port opening/closing portion 16, an exhaust port opening/closing portion 17, an inlet-side drive mechanism 18, an exhaust-side drive mechanism 19, and so forth. Note that in FIG. 3, part of the tailplane 102 is shown in perspective as a diagram including a cross section as viewed from the side of the pump unit 13. In addition, illustration of the elements other than the tailplane 102 and the hydraulic apparatus 1 are omitted in FIG. 3.

In this embodiment, the pump unit 13 is installed inside the tailplane 102 serving as a wing of the aircraft 100, as shown in FIG. 3. The inlet port 14 is provided as a hole formed through the wing structure portion 112 constituting the surface structure of the tailplane 102, and is formed as a hole from which the air outside the tailplane 102 can be supplied into the tailplane 102. The inlet port 14 may be formed, for example, as a rectangular through-hole, and is on the under-surface side of the tailplane 102.

The exhaust port 15 is provided as a hole formed through the wing structure portion 112, and is formed as a hole from which the air inside the tailplane 102 to the outside of the tailplane 102. The exhaust port 14 may be formed, for example, as a rectangular through-hole, and is on the top surface side of the tailplane 102.

The wing structure portion 112 in which the inlet port 14 and the exhaust port 15 are formed may be formed, for example, from carbon fiber reinforced plastics serving as a composite material. In addition, the wing structure portion 112 may contain a material other than carbon fiber reinforced plastics. Alternatively, the wing structure portion 112 may be made of fiber-reinforced plastics other than carbon fiber-reinforced plastics. For example, the wing structure portion 112 may be made of fiber-reinforced plastics such as glass fiber-reinforced plastics, glass mat reinforced plastics, boron fiber-reinforced plastics, aramid fiber-reinforced plastics, polyethylene fiber-reinforced plastics, and Zylon fiber-reinforced plastics.

As shown in FIGS. 2 and 3, the pump unit 13 includes a backup hydraulic pump 20, an electric motor 21, and so forth. Also, the pump unit 13 is installed inside the tailplane 102.

The backup hydraulic pump 20 may be configured, for example, as a variable capacity-type hydraulic pump. The suction side of the backup hydraulic pump 20 is connected in communication with the exhaust passage 110a, and its discharge side is connected in communication with the supply passage 105a via a check valve 22 so as to be able to supply pressure oil to the supply passage 105a. Further, the backup hydraulic pump 20 is provided as a hydraulic pump that can supply pressure oil to the actuator 104*a* at the occurrence of a loss or reduction in the function (pressure oil supply function) of the first aircraft central hydraulic power source 105 due to a failure of the hydraulic pump, oil leakage, and the like in the first aircraft central hydraulic power source 105.

A check valve 23 that permits flow of pressure oil into the actuator 104*a* and regulates flow of the oil in the opposite direction is provided upstream (on the first aircraft central hydraulic power source 105 side) of a location of the supply passage 105*a* where the discharge side of the backup hydraulic pump 20 is connected. Further, a relief valve 24 that discharges pressure oil into the reservoir circuit 110 when the pressure of the oil discharged from the actuator 104*a* rises is provided downstream (on the reservoir circuit 110 side) of a location of the exhaust passage 110*a* where the suction side of the backup hydraulic pump 20 is connected. Also, the relief valve 24 is provided with a pilot pressure chamber that is in communication with the supply passage 105*a* and in which a spring is disposed. When the pressure of the pressure oil supplied from the supply passage 105*a* decreases below a predetermined pressure value, the pressure of the pressure oil being supplied as a pilot pressure oil to the pilot pressure chamber (pilot pressure) from the supply passage 105*a* also decreases below a predetermined pressure value, as a result of which the exhaust passage 110*a* is blocked by the relief valve 24. In the case of a loss or reduction in the function of the first aircraft central hydraulic power source 105, the provision of the above-described check valves (22, 23) and the relief valve 24 allows the pressure of the oil discharged from the actuator 104*a* to be raised by the backup hydraulic pump 20 without the oil returning to the reservoir circuit 110, and the pressure oil with an increased pressure is supplied to the actuator 104*a*.

The electric motor 21 is coupled to the backup hydraulic pump 20 via a coupling (not shown), and is configured to drive the backup hydraulic pump 20. The electric motor 21 houses, inside its housing, a motor body portion (a rotor, a stator), and also a cooling fan for cooling the motor body portion. Further, the backup hydraulic pump 20 is fixed to the electric motor 21. Also, the housing of the electric motor 21 is fixed to the wing structure portion 112. The operational status of the electric motor 21 is controlled via a driver (not shown) in accordance with a command signal from the flight controller 12 serving as a superordinate computer that commands operation of the elevator 103. The above-noted driver is provided as a circuit board or the like that drives the electric motor 21 by controlling the electric power supplied to the electric motor 21 and the running speed (rotation speed) of the electric motor 21 in accordance with a command signal from the flight controller 12.

The flight controller 12 is connected to a pressure sensor (not shown) that detects the discharge pressure of the first aircraft central hydraulic power source 105 or the pressure of pressure oil passing through the supply passage 105*a* such that a pressure detecting signal detected by the pressure sensor is input into the flight controller 12. Also, the flight controller 12 is configured to detect a loss or reduction in the function of the first aircraft central hydraulic power source 105 in accordance with the above-described pressure detecting signal.

For example, the flight controller 12 may be configured to detect a reduction of the function of the first aircraft central hydraulic power source 105 according to the timing at which the pressure value of the pressure detecting signal becomes equal to or less than a predetermined first pressure value, and detect a loss of the function of the first aircraft central hydraulic power source 105 according to the timing at which the pressure value of the pressure detecting signal becomes equal to or less than a predetermined second pressure value that is smaller than the first pressure value. When a loss or reduction in the function of the first aircraft central hydraulic power source 105 is detected by the flight controller 12, the electric motor 21 is started to operate in accordance with a command signal from the flight controller 12, as a result of which pressure oil is supplied to the actuator 104*a* as described above. Furthermore, the electric motor 21 may be started in accordance with a signal from flight controller 12, for example, in a stage when the aircraft is placed in a landing attitude, regardless of the pressure detecting signal. This can ensure a safe flight even if a sudden loss or reduction of the function of the first aircraft central hydraulic power source 105 occurs in the landing stage, since the electric motor 21 is already in operation.

The inlet port opening/closing portion 16 is provided in the wing structure portion 112 at a portion near the inlet port 14. The inlet port opening/closing portion 16 includes an inlet-side lid member 16*a* that covers the inlet port 14 and a slide support portion (not shown) that slidably supports the inlet-side lid member 16*a*, and is configured to be capable of opening and closing the inlet port 14. The inlet-side lid member 16*a* may be provided, for example, as a planar member formed of a metallic material such as an aluminum alloy, and constitutes a first lid member of this embodiment.

The inlet-side drive mechanism 18 is configured to drive the inlet port opening/closing portion 16 to be opened and closed by causing the inlet-side lid member 16*a* slidably supported to the slide support portion of the inlet port opening/closing portion 16 to slidably move along the wing structure portion 112. The inlet-side drive mechanism 18 may be configured, for example, as a drive mechanism having an electric cylinder, a drive mechanism having a linear motor, or a drive mechanism having a hydraulic cylinder.

Figure 4:
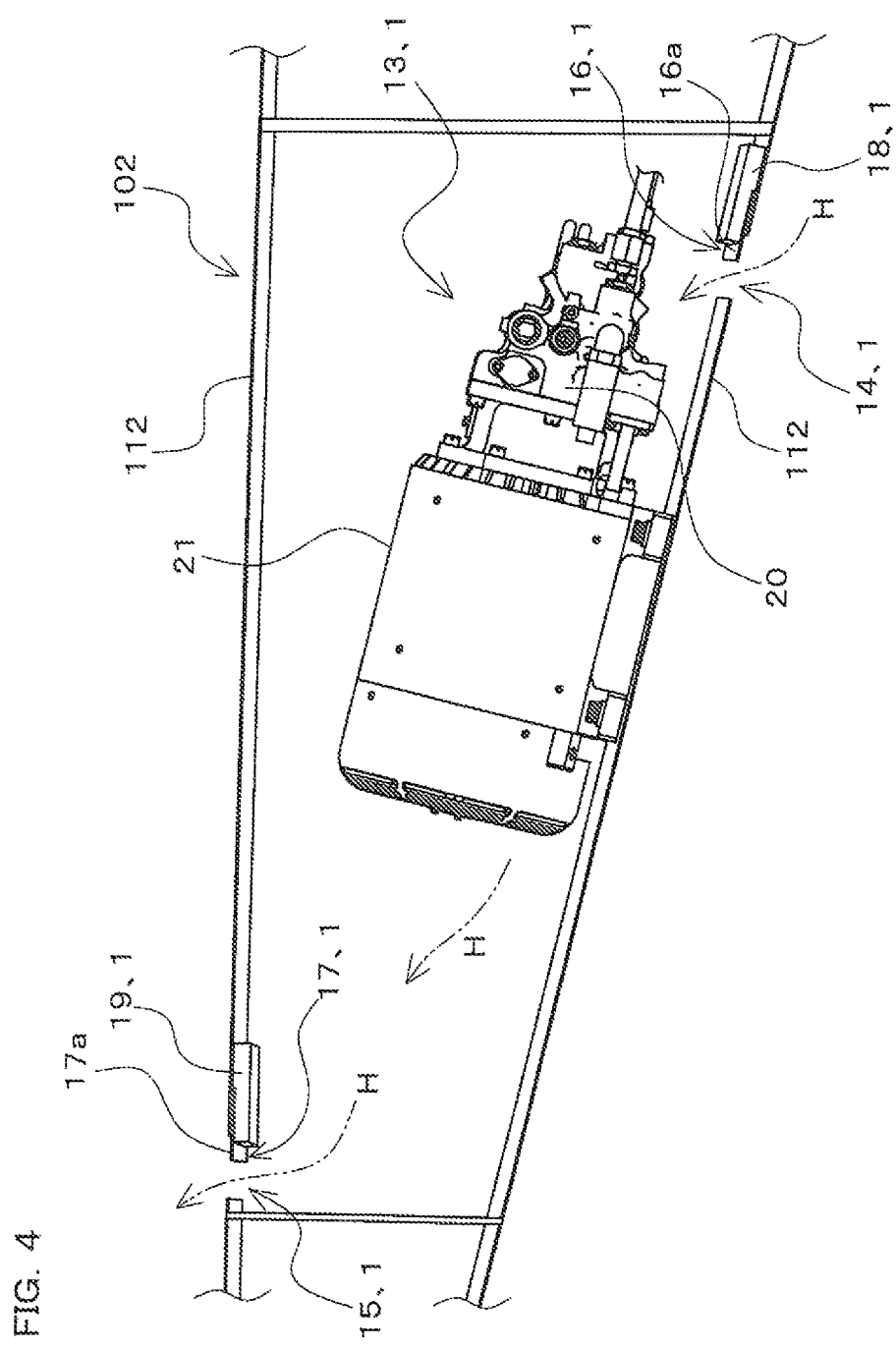
FIG. 4 is a diagram showing an operation of the hydraulic apparatus for aircraft actuators shown in FIG. 3.

FIG. 4 is a diagram illustrating an operation of the hydraulic apparatus 1, corresponding to FIG. 3, and shows a state where the inlet port opening/closing portion 16 and the exhaust port opening/closing portion 17, which will be described later, have opened the inlet port 14 and the exhaust port 15. As shown in FIG. 4, the inlet port opening/closing portion 16 is driven by the inlet-side drive mechanism 18 such that the inlet-side lid member 16*a* moves so as to open the inlet port 14, and thereby the inlet port opening/closing portion 16 opens the inside of the tailplane 102 to the outside. On the other hand, the inlet port opening/closing portion 16 is driven by the inlet-side drive mechanism 18 such that the inlet-side lid member 16*a* moves so as to cover the inlet port 14, and thereby the inlet port opening/closing portion 16 closes the inside of the tailplane 102 from the outside. In this way, the inlet port opening/closing portion 16 is configured such that its position can be switched between a position to open the inside of the tailplane 102 to the outside and a position to close the inside of the tailplane 102 from the outside by being driven by the inlet-side drive mechanism 18.

The exhaust port opening/closing portion 17 is provided in the wing structure portion 112 at a portion near the exhaust port 15. The exhaust port opening/closing portion 17 includes an exhaust-side lid member 17*a* that covers the exhaust port 15 and a slide support portion (not shown) that slidably supports the exhaust-side lid member 17*a*, and is configured to be capable of opening and closing the exhaust port 15. The exhaust-side lid member 17*a* may be provided, for example, as a planar member formed of a metallic material such as an aluminum alloy.

The exhaust-side drive mechanism 19 is configured to drive the exhaust port opening/closing portion 17 to be opened and closed by causing the exhaust-side lid member 17a slidably supported to the slide support portion of the exhaust port opening/closing portion 17 to slidably move along the wing structure portion 112. The exhaust-side drive mechanism 19 may be configured, for example, as a drive mechanism having a linear motor, a drive mechanism having an electric cylinder, or a drive mechanism having a hydraulic cylinder.

As shown in FIG. 4, the exhaust port opening/closing portion 17 is driven by the exhaust-side drive mechanism 19 such that the exhaust-side lid member 17a moves so as to open the exhaust port 15, and thereby the exhaust port opening/closing portion 17 opens the inside of the tailplane 102 to the outside. On the other hand, the exhaust port opening/closing portion 17 is driven by the exhaust-side drive mechanism 18 such that the exhaust-side lid member 17a moves so as to cover the exhaust port 15, and thereby the exhaust port opening/closing portion 17 closes the inside of the tailplane 102 to the outside. In this way, the exhaust port opening/closing portion 17 is configured such that its position can be switched between a position to open the inside of the tailplane 102 to the outside and a position to close the inside of the tailplane 102 from the outside by being driven by the exhaust-side drive mechanism 19.

Further, the inlet-side drive mechanism 18 and the exhaust-side drive mechanism 19 are configured to operate in accordance with command signals from the flight controller 12. The hydraulic apparatus 1 is configured such that the inlet port 14 is opened by the inlet-side drive mechanism 18 operating in accordance with a command signal from the flight controller 12 to operate the inlet port opening/closing portion 16 at the timing at which the backup hydraulic pump 20 is activated. Furthermore, the hydraulic apparatus 1 is configured such that the exhaust port 15 is closed by the exhaust-side drive mechanism 19 operating in accordance with a command signal from the flight controller 12 to operate the exhaust port opening/closing portion 17 at the timing at which the backup hydraulic pump 20 is activated.

Next, an operation of the hydraulic apparatus 1 will be described. Note that the operation of the hydraulic apparatus 1 will be described only for the hydraulic apparatus 1 connected with the first aircraft central hydraulic power source 105 and the operation of the hydraulic apparatus 1 connected with the second aircraft central hydraulic power source 106 is the same as this and thus is omitted, as with the description of the above configuration of the hydraulic apparatus 1.

In a state where a loss or reduction in the function of the first aircraft central hydraulic power source 105 has not occurred, the backup hydraulic pump 20 is not operated. In this state, the pressure oil from the first aircraft central hydraulic power source 105 is supplied to one of the oil chambers (107a, 107b) of the actuator 104a via the control valve 109a. The oil is discharged from the other of the oil chambers (107a, 107b) and is returned to the reservoir circuit 110 via the control valve 109a. Further, switching between the oil chambers (107a, 107b) to which pressure oil is supplied and from which the oil is discharged is performed by switching the state of connection of the control valve 109a in accordance with a command signal from the actuator controller 11a, as a result of which the actuator 104a is operated to drive the elevator 103.

As described above, in a state where a loss and a reduction of the function of the first aircraft central hydraulic power source 105 have not occurred and the backup hydraulic pump 20 is not in operation, the inlet port opening/closing portion 16 covers the inlet port 14 at the inlet-side lid member 16a, thus closing the inside of the tailplane 102 from the outside. The exhaust port opening/closing portion 17 covers the exhaust port 15 at the exhaust-side lid member 17a, thus closing the inside of tailplane 102 from the outside.

On the other hand, when a loss or reduction in the function of the first aircraft central hydraulic power source 105 occurs, the electric motor 21 is started to operate in accordance with a command signal from the flight controller 12, thus activating the backup hydraulic pump 20 and starting its operation. Then, the pressure oil from the backup hydraulic pump 20 is supplied to one of the oil chambers (107a, 107b) of the actuator 104a via the control valve 109a. The oil is discharged from the other of the oil chambers (107a, 107b) and is then sucked in by the backup hydraulic pump 20 via the control valve 109a, and thus the pressure of the oil is raised. Further, switching between the oil chambers (107a, 107b) to which pressure oil is supplied and from which the oil is discharged is performed by switching the state of connection of the control valve 109a in accordance with a command signal from the actuator controller 11a, as a result of which the actuator 104a is operated to drive the elevator 103.

With the hydraulic apparatus 1, the inlet-side drive mechanism 18 and the exhaust-side drive mechanism 19 operate in accordance with command signals from the flight controller 12 at the timing at which the backup hydraulic pump 20 is activated, as described above. Then, the inlet port opening/closing portion 16 is driven by the inlet-side drive mechanism 18 such that the inlet-side lid member 16a slidably moves, and the exhaust port opening/closing portion 17 is driven by the exhaust-side drive mechanism 19 such that the exhaust-side lid member 17a slidably moves. Consequently, the inlet port 14 is opened, and the exhaust port 15 is opened.

On the other hand, when the pump unit 13 of the hydraulic apparatus 1 is started to operate, the backup hydraulic pump 20 and the electric motor 21 generate heat, resulting in an increase in the temperature of the air inside the wing structure portion 112. In particular, in the case where the wing structure portion 112 is formed from carbon fiber reinforced plastics as in this embodiment, the temperature of the air inside the wing structure portion 112 can easily increase due to the high thermal insulation performance. Further, the temperature of the oil used in the hydraulic apparatus 1, or in other words, the oil that is pressured up by the backup hydraulic pump 20 and is supplied to the actuator 104a is also increased. Therefore, insufficient removal of the heat generated leads to a further increase in the temperature of the backup hydraulic pump 20, the electric motor 21, and the oil used.

However, with the hydraulic apparatus 1, the inlet port 14 and the exhaust port 15 are opened at the timing at which the backup hydraulic pump 20 is activated, as described above. Accordingly, opening the inlet port 14 allows the air outside the tailplane 102 to flow in from the inlet port 14 provided on the undersurface side of the tailplane 102, which is the high-pressure side in the tailplane 102. Also, opening the exhaust port 15 allows the air inside the tailplane 102 to flow out from the exhaust port 15 provided on the top surface side of the tailplane 102, which is the low-pressure side in the tailplane 102. In this way, air flows of the low-temperature air outside the tailplane 102 flowing into the tailplane 102 from the inlet port 14 and of the air inside the tailplane 102 flowing out from the exhaust port 15 to the outside are formed. That is, air flows as indicated by the arrows H shown by the two-dot chain lines in FIG. 4 are formed.

The heat generated in the backup hydraulic pump 20, the electric motor 21, and the oil being used is conducted to the air inside the wing structure portion 112 by heat conduction, heat transmission (convection), and heat radiation. Then, the heat conducted to the air inside the wing structure portion 112 is removed to the outside of the tailplane 102, along with the above-described air flows of the air outside the tailplane 102 flowing in from the inlet port 14 and the air inside the tailplane 102 flowing out from the exhaust port 15 (the air flows indicated by the arrows H shown by the two-dot chain lines). In other words, the low-temperature air outside the tailplane 102 is supplied into the tailplane 102, and the high-temperature air inside the tailplane 102 is discharged to the outside of the tailplane 102. Consequently, the hydraulic apparatus 1 is cooled via the air flowing in from the inlet port 14 through the inside of the wing structure portion 112 to the exhaust port 15, and the backup hydraulic pump 20, the electric motor 21, and the oil being used are cooled, suppressing an increase in the temperature of these components.

As described thus far, with the hydraulic apparatus 1, even if a loss or reduction in the function of the aircraft central hydraulic power sources (105, 106) occurs, the actuator 104a can be driven by the pressure oil being supplied from the backup hydraulic pump 20 of the pump unit 13 installed inside the tailplane 102. Since the pump unit 13 is installed inside the tailplane 102, it is possible to realize the size reduction and the weight reduction for the hydraulic apparatus 1. Moreover, with the hydraulic apparatus 1, the inlet port opening/closing portion 16 and the exhaust port opening/closing portion 17 operate to open the inlet port 14 and the exhaust port 15, thus making it possible to supply the low-temperature air outside the tailplane 102 into the tailplane 102 and discharge the high-temperature air inside the tailplane 102 to the outside of the tailplane 102. Accordingly, the heat generated from the backup hydraulic pump 20 and the electric motor 21 of the hydraulic apparatus 1 can be removed by the air flowing in from the inlet port 14 to the exhaust port 15, and thereby the hydraulic apparatus 1 is cooled. That is, the heat generated in the hydraulic apparatus 1 can be released directly to the atmosphere outside the tailplane 102. Furthermore, this also makes it possible to utilize the cooling function of the oil used in the hydraulic apparatus 1, thus suppressing an increase in the oil temperature.

Therefore, according to this embodiment, it is possible to provide a hydraulic apparatus 1 for aircraft actuators that can drive the actuator 104a even in the case of a loss or reduction in the function of the aircraft central hydraulic power sources (105, 106), can realize a reduction in size and weight of the configuration of the apparatus, and can suppress an increase in the temperature of the apparatus and the oil used.

With the hydraulic apparatus 1, the inlet port 14 is on the undersurface side, which is the high-pressure side in the tailplane 102, and the exhaust port 15 is on the top surface side, which is the low-pressure side. Accordingly, by opening the inlet port 14 and the exhaust port 15, the air flows of the outside air flowing into the tailplane 102 from the inlet port 14, which is the high-pressure side, and of the air inside the tailplane 102 flowing out from the exhaust port 15, which is the low-pressure side, can be easily formed. Consequently, the heat generated in the hydraulic apparatus 1 can be efficiently released to the atmosphere outside the tailplane 102.

With the hydraulic apparatus 1, the inlet-side lid member 16a that covers the inlet port 14 at the inlet port opening/closing portion 16 is driven by the inlet-side drive mechanism 18 to slidably move along the wing structure portion 112, and thereby the inlet port 14 is opened or closed. Accordingly, the direction of movement of the inlet-side lid member 16a for opening and closing the inlet port 14 is a direction along the plane direction of the inlet-side lid member 16a, and it is therefore possible to prevent the inlet-side lid member 16a from being opened and closed in a direction against the inflow direction of the outside air flowing into the tailplane 102 via the inlet port 14. Thus, it is possible to reduce the air resistance that acts to prevent the movement of the inlet-side lid member 16a during opening and closing of the inlet port 14. This makes it possible to achieve an inlet port opening/closing portion 16 and an inlet-side drive mechanism 18 that facilitate the opening/closing operation of the inlet port 14.

With the hydraulic apparatus 1, the electric motor 21 of the pump unit 13, the inlet-side drive mechanism 18 that drives the inlet port opening/closing portion 16 to be opened and closed, and the exhaust-side drive mechanism 19 that drives the exhaust port opening/closing portion 17 to be opened and closed operate in accordance with command signals from the flight controller 12 that controls the operation of the elevator 103 via the actuator 104 for driving the elevator 103. Accordingly, it is possible, by effectively utilizing the flight controller 12, to achieve a control configuration that can activate the pump unit 13 in response to the operation status of the actuator 104 for driving the elevator 103 and can open the inlet port 14 and the exhaust port 15, without adding an extra control apparatus.

With the hydraulic apparatus 1, the inlet port 14 and the exhaust port 15 are opened at the timing at which the backup hydraulic pump 20 is activated. Therefore, the heat generated in the hydraulic apparatus 1 can be quickly released to the atmosphere outside the tailplane 102. During a normal flight in which the hydraulic apparatus 1 is not in operation, the inlet port 14 and the exhaust port 15 will not be opened, and it is therefore possible to prevent the air outside the tailplane 102 from flowing into the tailplane 102 and thus causing a reduction in the wing efficiency of the tailplane 102.

Second Embodiment

Next, a hydraulic apparatus 2 for aircraft actuators (hereinafter, also simply referred to as a "hydraulic apparatus 2") according to a second embodiment of the present invention will be described. As with the hydraulic apparatus 1 of the first embodiment, the hydraulic apparatus 2 is installed inside the tailplane 102 of the aircraft 100, and is configured to supply pressure oil to the hydraulically-operated actuator 104a for driving the elevator 103. Also, the hydraulic apparatus 2 is connected with the first aircraft central hydraulic power source 105, the reservoir circuit 110, and the control valve 109a with the same hydraulic circuit configuration as that of the hydraulic apparatus 1 of the first embodiment. Further, the hydraulic apparatus 2 is configured to operate in accordance with a command signal from the flight controller 12 as with the hydraulic apparatus 1.

Figure 5:
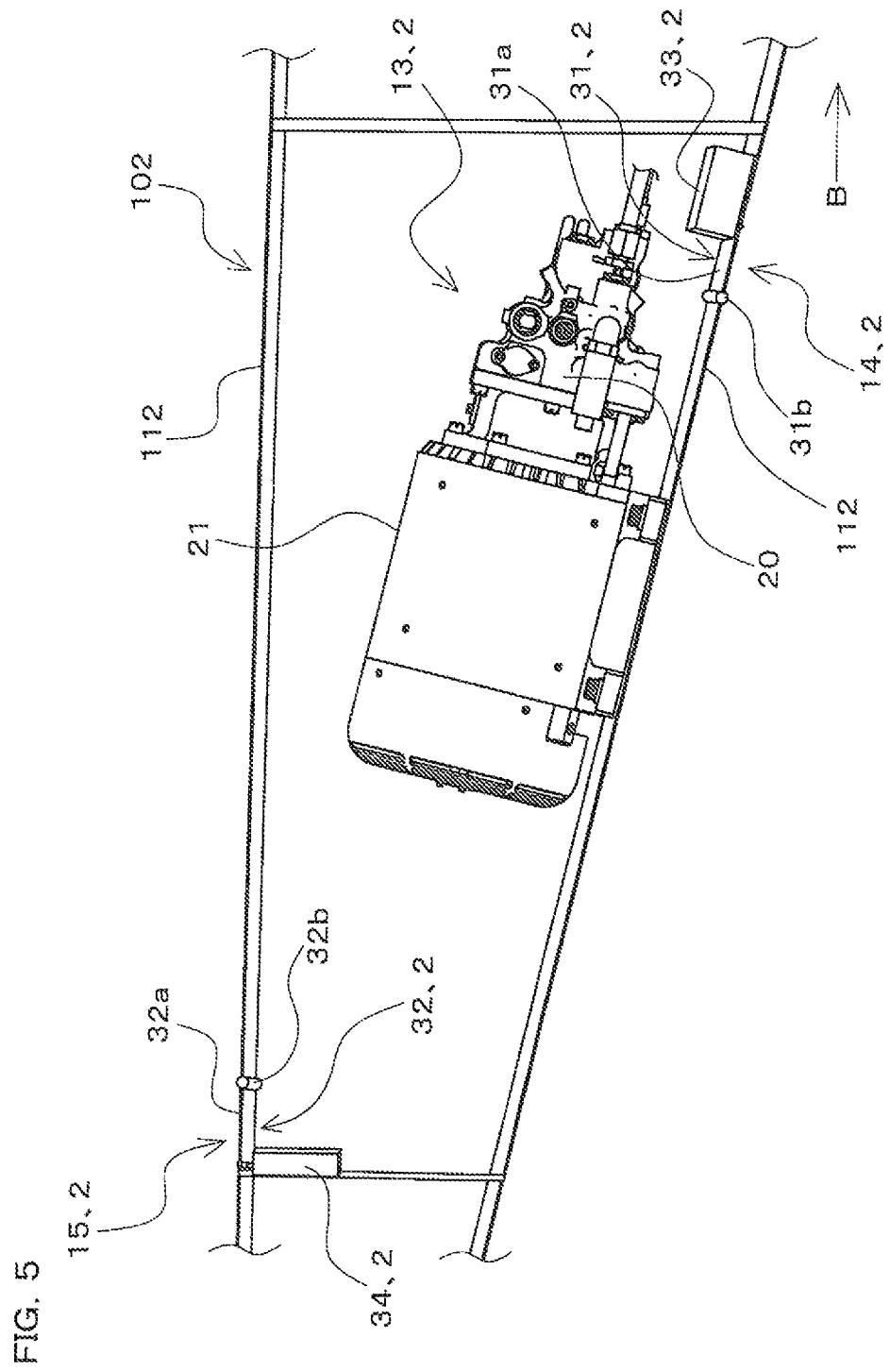
FIG. 5 is a diagram showing a hydraulic apparatus for aircraft actuators according to a second embodiment of the present invention together with part of a wing.

FIG. 5 is a diagram showing the hydraulic apparatus 2 together with part of the tailplane 102, in a state corresponding to FIG. 3 of the first embodiment. As shown in FIG. 5, the hydraulic apparatus 2 includes the pump unit 13, the inlet port 14, the exhaust port 15, an inlet port opening/closing portion 31, an exhaust port opening/closing portion 32, the inlet-side drive mechanism 33, an exhaust-side drive mechanism 34, and so forth, as with the hydraulic apparatus 1 of the first embodiment. However, the configuration of the hydraulic apparatus 2 is different from that of the hydraulic apparatus 1 of the first embodiment with respect to the inlet port opening/closing portion 31, the exhaust port opening/closing portion 32, the inlet-side drive mechanism 33, and the exhaust-side drive mechanism 34. In the following description of the hydraulic apparatus 2, the differences in configuration from the first embodiment will be described. The description of those elements configured in the same manner as in the first embodiment is omitted by using the same reference numerals in the drawings, or by referring to the same reference numerals.

The inlet port opening/closing portion 31 is provided in the wing structure portion 112 at a portion near the inlet port 14.

The inlet port opening/closing portion 31 includes an inlet-side lid member 31a that covers the inlet port 14 and a rotating shaft 31b that rotatably supports the inlet-side lid member 31a, and is configured to be capable of opening and closing the inlet port 14. The inlet-side lid member 31a is installed so as to be pivotable via the rotating shaft 31b in the wing structure portion 112. The inlet-side lid member 31a may be provided, for example, as a planar member formed of a metallic material such as an aluminum alloy, and constitutes a second lid member of this embodiment.

Figure 6:
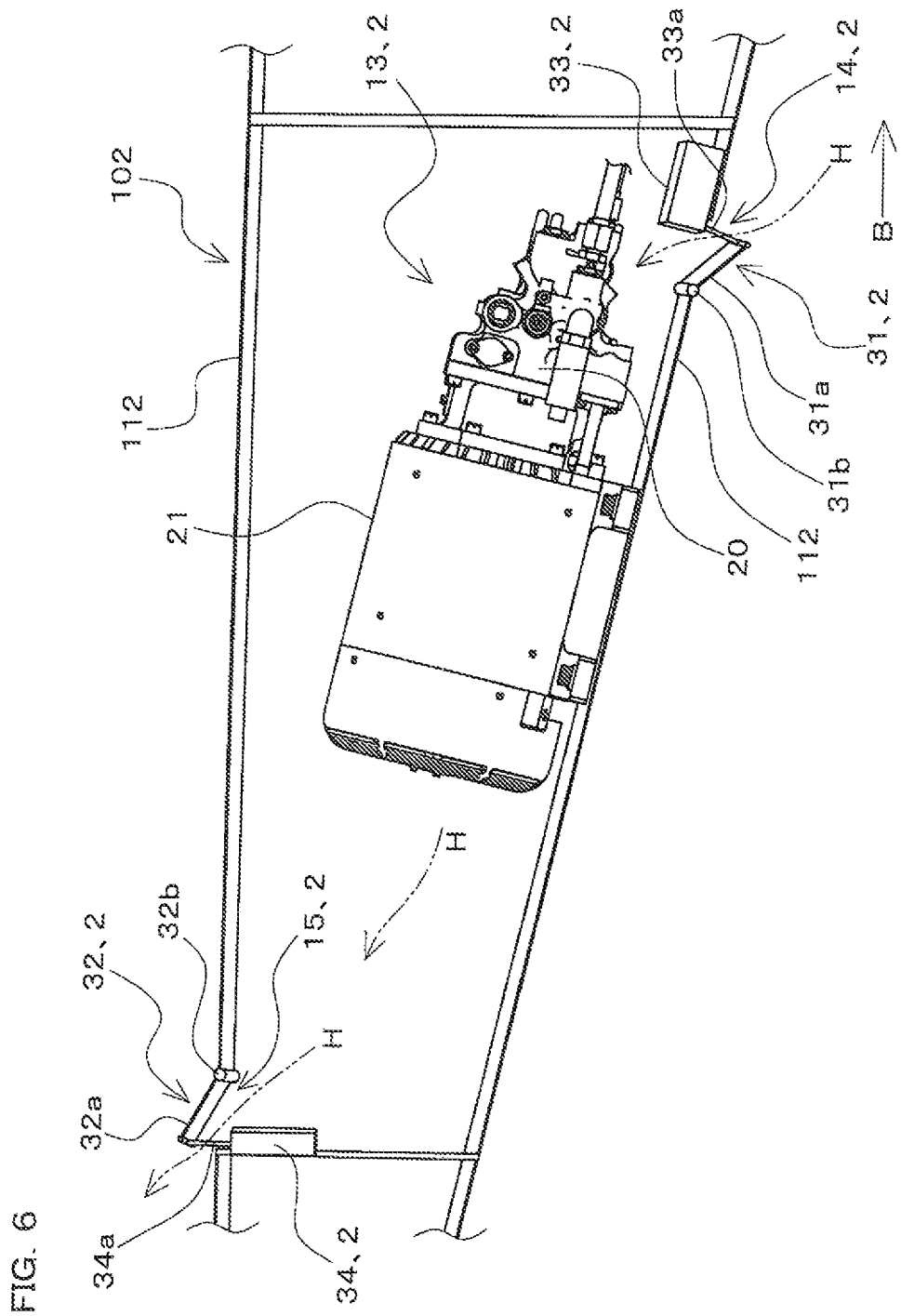
FIG. 6 is a diagram showing an operation of the hydraulic apparatus for aircraft actuators shown in FIG. 5.

FIG. 6 is a diagram illustrating an operation of the hydraulic apparatus 2, corresponding to FIG. 5, and shows a state where the inlet port opening/closing portion 31 and the exhaust port opening/closing portion 32, which will be described later, have opened the inlet port 14 and the exhaust port 15. The inlet-side drive mechanism 33 is provided as a mechanism for driving the inlet port opening/closing portion 31 to be opened and closed, and is configured to drive the inlet-side lid member 31a rotatably supported to the rotating shaft 31b to open toward the front side in the flight direction of the aircraft 100 (the direction indicated by the arrow B in FIGS. 5 and 6). The inlet-side drive mechanism 33 may be configured, for example, as a drive mechanism having an electric cylinder, a drive mechanism having a linear motor, or a drive mechanism having a hydraulic cylinder. As shown in FIG. 6, the inlet-side drive mechanism 33 is configured to drive the inlet-side lid member 31a via a link 33a associated with the drive mechanism.

The inlet port opening/closing portion 31 is driven by the inlet-side drive mechanism 33 such that the inlet-side lid member 31a pivots so as to open the inlet port 14, and thereby the inlet port opening/closing portion 31 opens the inside of the tailplane 102 to the outside. On the other hand, the inlet port opening/closing portion 31 is driven by the inlet-side drive mechanism 33 such that the inlet-side lid member 31a pivots so as to cover the inlet port 14, and thereby the inlet port opening/closing portion 31 closes the inside of the tailplane 102 to the outside. In this way, the inlet port opening/closing portion 31 is configured such that its position can be switched between a position to open the inside of the tailplane 102 to the outside and a position to close the inside of the tailplane 102 from the outside by being driven by the inlet-side drive mechanism 33.

The exhaust port opening/closing portion 32 is provided in the wing structure portion 112 at a portion near the exhaust port 15. The exhaust port opening/closing portion 32 includes an exhaust-side lid member 32a that covers the exhaust port 15 and a rotating shaft 32b that rotatably supports the exhaust-side lid member 32a, and is configured to be capable of opening and closing the exhaust port 15. The exhaust-side lid member 32a is installed in the wing structure portion 112 so as to be pivotable via the rotating shaft 32b. The exhaust-side lid member 32a may be provided, for example, as a planar member formed of a metallic material such as an aluminum alloy.

The exhaust-side drive mechanism 34 is provided as a mechanism for driving the exhaust port opening/closing portion 32 to be opened and closed, and is configured to drive the exhaust-side lid member 32a rotatably supported to the rotating shaft 32b to open toward the rear side in the flight direction of the aircraft 100 (the direction opposite to the direction indicated by arrow B in FIGS. 5 and 6). The exhaust-side drive mechanism 34 may be configured, for example, as a drive mechanism having an electric cylinder, a drive mechanism having a linear motor, or a drive mechanism having a hydraulic cylinder. As shown in FIG. 6, the exhaust-side drive mechanism 34 is configured to drive the exhaust-side lid member 32a via a link 34a associated with the above-stated drive mechanism.

The exhaust port opening/closing portion 32 is driven by the exhaust-side drive mechanism 34 such that the exhaust-side lid member 32a pivots so as to open the exhaust port 15, and thereby the exhaust port opening/closing portion 32 opens the inside of the tailplane 102 to the outside. On the other hand, the exhaust port opening/closing portion 32 is driven by the exhaust-side drive mechanism 34 such that the exhaust-side lid member 32a pivots so as to cover the exhaust port 15, and thereby the exhaust port opening/closing portion 32 closes the inside of the tailplane 102 from the outside. In this way, the exhaust port opening/closing portion 32 is configured such that its position can be switched between a position to open the inside of the tailplane 102 to the outside and a position to close the inside of the tailplane 102 from the outside by being driven by the exhaust-side drive mechanism 34.

Further, the inlet-side drive mechanism 33 and the exhaust-side drive mechanism 34 are configured to operate in accordance with command signals from the flight controller 12. The hydraulic apparatus 2 is configured such that the inlet port 14 is opened by the inlet-side drive mechanism 33 operating in accordance with a command signal from the flight controller 12 to operate the inlet port opening/closing portion 31 at the timing at which the backup hydraulic pump 20 is activated. Furthermore, the hydraulic apparatus 2 is configured such that the exhaust port 15 is closed by the exhaust-side drive mechanism 34 operating in accordance with a command signal from the flight controller 12 to operate the exhaust port opening/closing portion 32 at the timing at which the backup hydraulic pump 20 is activated.

With the hydraulic apparatus 2 described above, as with the hydraulic apparatus 1 of the first embodiment, if a loss and a reduction of the function occur in the first aircraft central hydraulic power source 105, the electric motor 21 is started to operate in accordance with a command signal from the flight controller 12, and the backup hydraulic pump 20 is activated to start its operation. Then, the pressure oil from the backup hydraulic pump 20 is supplied to one of the oil chambers (107a, 107b) of the actuator 104a via the control valve 109a. The oil is discharged from the other of the oil chambers (107a, 107b) and is then sucked in by the backup hydraulic pump 20 via the control valve 109a, and thus the pressure of the oil is raised. Further, switching between the oil chambers (107a, 107b) to which pressure oil is supplied and from which the oil is discharged is performed by switching the state of connection of the control valve 109a in accordance with a command signal from the actuator controller 11a, as a result of which the actuator 104a is operated to drive the elevator 103.

With the hydraulic apparatus 2, the inlet-side drive mechanism 33 and the exhaust-side drive mechanism 34 operate in accordance with command signals from the flight controller 12 at the timing at which the backup hydraulic pump 20 is activated. Then, the inlet port opening/closing portion 31 is driven by the inlet-side drive mechanism 33 such that the inlet-side lid member 31a pivots so as to be opened, and the exhaust port opening/closing portion 32 is driven by the exhaust-side drive mechanism 34 such that the exhaust-side lid member 32a pivots so as to be opened. Consequently, the inlet port 14 is opened, and the exhaust port 15 is opened.

With the hydraulic apparatus 2, the inlet port 14 is opened at the timing at which the backup hydraulic pump 20 is activated, as described above, and thereby the air outside the tailplane 102 flows in from the inlet port 14 provided on the undersurface side of the tailplane 102, which is the high-pressure side in the tailplane 102. Then, opening the exhaust port 15 with the same timing allows the air inside the tailplane 102 to flow out from the exhaust port 15 provided on the top surface side of the tailplane 102, which is the low-pressure side in the tailplane 102. In this way, air flows of the low-temperature air outside the tailplane 102 flowing into the tailplane 102 from the inlet port 14 and the air inside the tailplane 102 flowing out from the exhaust port 15 to the outside are formed. That is, air flows as indicated by the arrows H shown by the two-dot chain lines in FIG. 6 are formed.

Thus, with the hydraulic apparatus 2, the heat that has been generated in the backup hydraulic pump 20, the electric motor 21, and the oil being used, and has been conducted to the air inside the wing structure portion 112 is removed to the outside, along with the air flows of the air outside the tailplane 102 flowing in from the inlet port 14 and the air inside the tailplane 102 flowing out from the exhaust port 15 (the air flows indicated by the arrows H shown by the two-dot chain lines), as with the hydraulic apparatus 1 of the first embodiment. In other words, the low-temperature air outside the tailplane 102 is supplied into the tailplane 102, and the high-temperature air inside the tailplane 102 is discharged to the outside of the tailplane 102. Consequently, the hydraulic apparatus 2 is cooled via the air flowing through the inside of the wing structure portion 112, and the backup hydraulic pump 20, the electric motor 21, and the oil being used are cooled, suppressing an increase in the temperature of these components.

According to this embodiment described thus far, it is possible to achieve the same effect as the first embodiment. That is, according to this embodiment, it is possible to provide a hydraulic apparatus 2 for aircraft actuators that can drive the actuator 104a even in the case of a loss or reduction in the function of the aircraft central hydraulic power sources (105, 106), can realize a reduction in size and weight of the configuration of the apparatus, and can suppress an increase in the temperature of the apparatus and the oil used.

Moreover, with the hydraulic apparatus 2, the inlet-side lid member 31a that covers the inlet port 14 at the inlet port opening/closing portion 31 is driven by the inlet-side drive mechanism 33 to be opened toward the front side in the flight direction of the aircraft 100. Accordingly, the air can be easily flowed in from the inlet port 14 from the front side in the flight direction along the flow of the air in the vicinity of the tailplane 102. This makes it possible to achieve an inlet port opening/closing portion 31 and an inlet-side drive mechanism 33 that can supply the low-temperature atmosphere outside the tailplane 102 into the tailplane 102 via the inlet port 14 efficiently.

Third Embodiment

Next, a hydraulic apparatus 3 for aircraft actuators (hereinafter, also simply referred to as a "hydraulic apparatus 3") according to a third embodiment of the present invention will be described. As with the hydraulic apparatus 1 of the first embodiment, the hydraulic apparatus 3 is installed inside the tailplane 102 of the aircraft 100, and is configured to supply pressure oil to the hydraulically-operated actuator 104a for driving the elevator 103.

Figure 7:
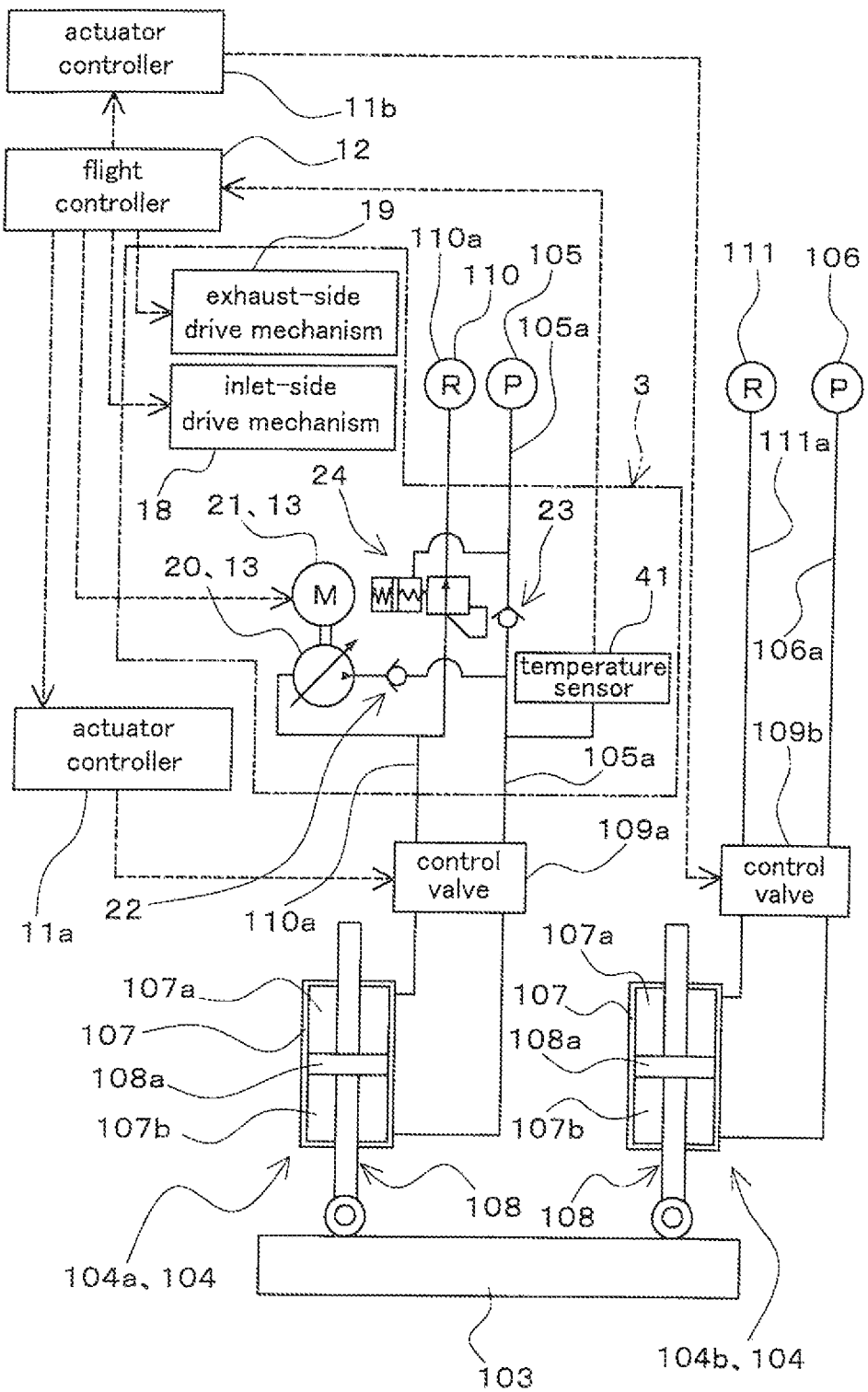
FIG. 7 is a hydraulic circuit diagram schematically showing a hydraulic circuit including a hydraulic apparatus for aircraft actuators according to a third embodiment of the present invention and actuators.

FIG. 7 is a hydraulic circuit diagram schematically showing a hydraulic circuit including the actuators (104a, 104b) for driving an elevator 103 provided in one of the tailplanes 102 and a hydraulic apparatus 3 configured to supply pressure oil to one of the actuators, namely the actuator 104a, corresponding to FIG. 2 of the first embodiment. As shown in FIG. 7, the hydraulic apparatus 3 has the same hydraulic circuit configuration as that of the hydraulic apparatus 1 of the first embodiment, and is connected with the first aircraft central hydraulic power source 105, the reservoir circuit 110, and the control valve 109a. Further, the hydraulic apparatus 3 is configured to operate in accordance with a command signal from the flight controller 12 as with the hydraulic apparatus 1.

The hydraulic apparatus 3 includes the pump unit 13, the inlet port 14, the exhaust port 15, the inlet port opening/closing portion 16, the exhaust port opening/closing portion 17, the inlet-side drive mechanism 18, the exhaust-side drive mechanism 19, and so forth, as with the hydraulic apparatus 1 of the first embodiment. However, the hydraulic apparatus 3 is different from the hydraulic apparatus 1 of the first embodiment in that it further includes a temperature sensor 41. In the following description of the hydraulic apparatus 3, the differences in configuration from the first embodiment will be described. The description of those elements configured in the same manner as in the first embodiment is omitted by using the same reference numerals in the drawings, or by referring to the same reference numerals.

The temperature sensor 41 is provided as a sensor that is connected to a supply passage 105a so as to be capable of detecting the oil temperature in the supply passage 105a on the downstream side of the backup hydraulic pump 20. In other words, the temperature sensor 41 is configured to detect the temperature of the oil used as the pressure oil supplied from the backup hydraulic pump 20. The hydraulic apparatus 3 is configured such that a signal relating to a result of the detection of the oil temperature performed by the temperature sensor 41 is input into the flight controller 12.

The inlet-side drive mechanism 18 and the exhaust-side drive mechanism 19 are configured so as to operate in accordance with command signals from the flight controller 12. When the oil temperature detected by the temperature sensor 41 is a high temperature greater than or equal to a predetermined temperature, the flight controller 12 outputs command signals to the inlet-side drive mechanism 18 and the exhaust-side drive mechanism 19 so as to operate the inlet port opening/closing portion 16 and the exhaust port opening/closing portion 17 to open the inlet port 14 and the exhaust port 15, respectively. Thus, the hydraulic apparatus 3 is configured such that the inlet-side drive mechanism 18 and the exhaust-side drive mechanism 19 are operated in accordance with a result of the detection performed by the temperature sensor 41, thus opening the inlet port 14 and the exhaust port 15.

With the hydraulic apparatus 3 described above, as with the hydraulic apparatus 1 of the first embodiment, when a loss or reduction in the function of the first aircraft central hydraulic power source 105 occurs, the electric motor 21 is started to operate in accordance with a command signal from the flight controller 12, thus activating the backup hydraulic pump 20 and starting its operation. Then, the pressure oil from the backup hydraulic pump 20 is supplied to one of the oil chambers (107a, 107b) of the actuator 104a via the control valve 109a. The oil is discharged from the other of the oil chambers (107a, 107b) and is then sucked in by the backup hydraulic pump 20 via the control valve 109a, and thus the pressure of the oil is raised. Further, switching between the oil chambers (107a, 107b) to which pressure oil is supplied and from which the oil is discharged is performed by switching the state of connection of the control valve 109a in accordance with a command signal from the actuator controller 11a, as a result of which the actuator 104a is operated to drive the elevator 103.

With the hydraulic apparatus 3, the inlet-side drive mechanism 18 and the exhaust-side drive mechanism 19 operate in accordance with command signals from the flight controller 12 at the timing at which the oil temperature detected by the temperature sensor 41 becomes greater than or equal to a predetermined temperature. Then, the inlet port opening/closing portion 16 is driven by the inlet-side drive mechanism 18 such that the inlet-side lid member 16a slidably moves, and the exhaust port opening/closing portion 17 is driven by the exhaust-side drive mechanism 19 such that the exhaust-side lid member 17a slidably moves. Consequently, the inlet port 14 is opened, and the exhaust port 15 is opened.

With the hydraulic apparatus 3, the inlet port 14 is opened at the timing at which the oil temperature detected by the temperature sensor 41 becomes greater than or equal to a predetermined temperature, as described above, and thereby the air outside the tailplane 102 flows in from the inlet port 14 provided on the undersurface side of the tailplane 102, which is the high-pressure side in the tailplane 102. Then, opening the exhaust port 15 with the same timing allows the air inside the tailplane 102 to flow out from the exhaust port 15 provided on the top surface side of the tailplane 102, which is the low-pressure side in the tailplane 102. In this way, air flows of the low-temperature air outside the tailplane 102 flowing into the tailplane 102 from the inlet port 14 and the air inside the tailplane 102 flowing out from the exhaust port 15 to the outside are formed.

Thus, with the hydraulic apparatus 3, the heat that has been generated in the backup hydraulic pump 20, the electric motor 21, and the oil being used, and has been conducted to the air inside the wing structure portion 112 is removed to the outside of the tailplane 102, along with the air flows of the air outside the tailplane 102 flowing in from the inlet port 14 and the air inside the tailplane 102 flowing out from the exhaust port 15, as with the hydraulic apparatus 1 of the first embodiment. In other words, the low-temperature air outside the tailplane 102 is supplied into the tailplane 102, and the high-temperature air inside the tailplane 102 is discharged to the outside of the tailplane 102. Consequently, the hydraulic apparatus 3 is cooled via the air flowing through the inside of the wing structure portion 112, and the backup hydraulic pump 20, the electric motor 21, and the oil being used are cooled, suppressing an increase in the temperature of these components.

According to this embodiment described thus far, it is possible to achieve the same effect as the first embodiment. That is, according to this embodiment, it is possible to provide a hydraulic apparatus 3 for aircraft actuators that can drive the actuator 104a even in the case of a loss or reduction in the function of the aircraft central hydraulic power sources (105, 106), can realize a reduction in size and weight of the configuration of the apparatus, and can suppress an increase in the temperature of the apparatus and the oil used.

Moreover, with the hydraulic apparatus 3, the temperature of the oil used is detected by the temperature sensor 41, and the inlet port 14 and the exhaust port 15 are opened in accordance with a result of the detection. Therefore, the inlet port 14 and the exhaust port 15 can be efficiently opened at the timing at which the temperature of the oil used in the hydraulic apparatus 3 has increased, and the heat generated in the hydraulic apparatus 3 can be quickly released to the atmosphere outside the tailplane 102. It is therefore possible to prevent the air outside the tailplane 102 from flowing into the tailplane 102 and thus causing a reduction in the wing efficiency of the tailplane 102, in a state where the temperature of the oil used in the hydraulic apparatus 3 has not increased.

Figure 8:
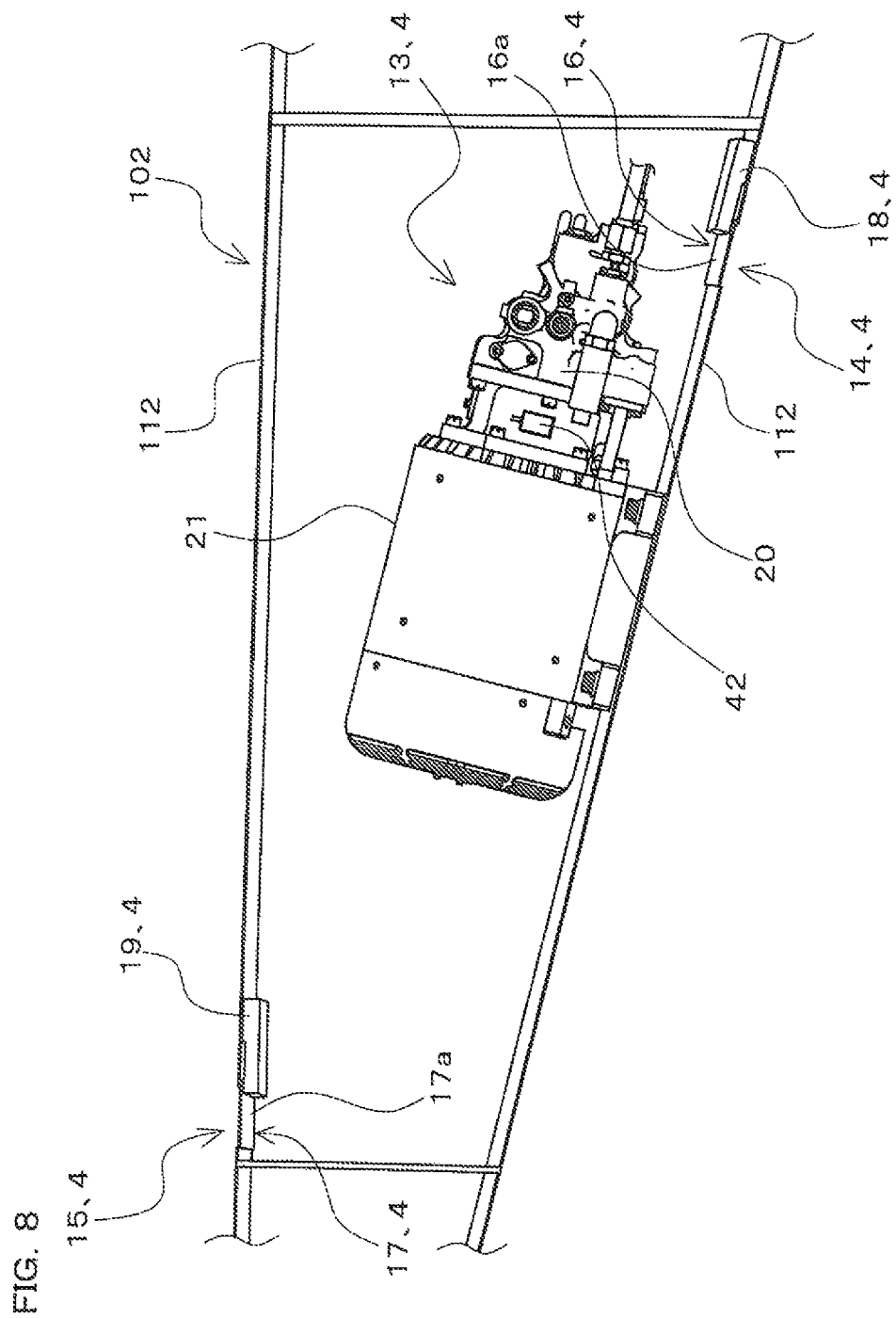
FIG. 8 is a diagram showing a hydraulic apparatus for aircraft actuators according to a modification, together with part of a wing.

Although the third embodiment above has been described, taking as an example, a configuration in which the inlet port 14 and the exhaust port 15 are opened in accordance with a result of the detection performed by the temperature sensor 41 that detects the temperature of the oil used as the pressure oil supplied from the backup hydraulic pump 20, this need not be the case. FIG. 8 is a diagram illustrating a modification of the temperature sensor, and corresponds to FIG. 3 of the first embodiment. A hydraulic apparatus 4 for aircraft actuators according to the modification shown in FIG. 8 is provided with a temperature sensor 42 that is installed in the backup hydraulic pump 20 of the pump unit 13 and detects the temperature of the pump unit 13. Also, the hydraulic apparatus 4 for aircraft actuators according to this modification is configured such that the inlet port 14 and the exhaust port 15 are opened by the inlet port opening/closing portion 16 and the exhaust port opening/closing portion 17 operating in accordance with a result of the detection performed by the temperature sensor 42. As such, it is possible to adopt a configuration in which the inlet port 14 and the exhaust port 15 are opened in accordance with a result of the detection performed by the temperature sensor 42 that detects the temperature of the pump unit 13. It is also possible to adopt a configuration in which a temperature sensor (not shown) is provided that is installed inside the tailplane 102 separately from the pump unit 13 and that detects the temperature of the air inside the tailplane 102, and the inlet port 14 and the exhaust port 15 are opened by the inlet port opening/closing portion 16 and the exhaust port opening/closing portion 17 operating in accordance with a result of the detection performed by this temperature sensor.

Although embodiments of the present invention have been described thus far, the present invention is not limited to the above-described first to third embodiments, and various modifications may be made within the scope recited in the claims. For example, it is possible to implement a hydraulic apparatus for aircraft actuators that supplies pressure oil to an actuator for driving a control surface other than an elevator, such as an aileron. Further, various modifications can be made for the configuration of the hydraulic circuit that connects the hydraulic apparatus for aircraft actuators with the aircraft central hydraulic power sources. Various modifications can be made for the arrangement and the shape of the inlet port and the exhaust port may be changed as appropriate. Various modifications can also be made for the configuration of the exhaust port opening/closing portion, the exhaust port opening/closing portion, the inlet-side drive mechanism, and the exhaust-side drive mechanism. The inlet port opening/closing portion and the exhaust port opening/closing portion may be configured such that, once they are opened during a flight of the aircraft, they can be kept open until the aircraft makes a landing.

The present invention can be widely used as a hydraulic apparatus for aircraft actuators that supplies pressure oil to a hydraulically-operated actuator for driving a control surface of an aircraft. The present invention is not limited to the above-described embodiments, and all modifications, applications and equivalents thereof that fall within the claims, for which modifications and applications would become apparent by reading and understanding the present specification, are intended to be embraced therein.

What is claimed is:

1. A hydraulic apparatus for aircraft actuators to supply pressure oil to a hydraulically-operated actuator for driving a control surface of an aircraft, the apparatus comprising:
   a pump unit installed inside a wing of the aircraft;
   an inlet port provided as a hole formed through a wing structure portion forming a surface structure of the wing and to supply air outside the wing into the wing;
   an exhaust port provided as a hole formed through the wing structure portion and to discharge air inside the wing to the outside of the wing;

an inlet port opening/closing portion provided in the wing structure portion, the inlet port opening/closing portion being switchable between a position to open the inside of the wing to the outside and a position to close the inside of the wing from the outside, and being adapted to open and close the inlet port; and an exhaust port opening/closing portion provided in the wing structure portion, the exhaust port opening/closing portion being switchable between a position to open the inside of the wing to the outside and a position to close the inside of the wing from the outside, and being adapted to open and close the exhaust port, wherein the pump unit includes a backup hydraulic pump to supply pressure oil to the actuator when a loss or reduction occurs in a function of an aircraft central hydraulic power source and an electric motor to drive the backup hydraulic pump, and the inlet port and the exhaust port are configured to open or close at a same time so as to affect temperature inside the wing of the aircraft and thus the backup hydraulic pump disposed inside the wing.

2. The hydraulic apparatus for aircraft actuators according to claim 1, wherein the inlet port is on an undersurface side of the wing and the exhaust port is on a top surface side of the wing.

3. The hydraulic apparatus for aircraft actuators according to claim 1, further comprising:

an inlet-side drive mechanism to drive the inlet port opening/closing portion to be opened and closed, wherein the inlet port opening/closing portion includes a first lid member adapted to cover the inlet port, and the inlet-side drive mechanism being adapted to drive the inlet port opening/closing portion to be opened and closed by causing the first lid member to slidably move along the wing structure portion.

4. The hydraulic apparatus for aircraft actuators according to claim 1, further comprising:

an inlet-side drive mechanism to drive the inlet port opening/closing portion to be opened and closed, wherein the inlet port opening/closing portion includes a second lid member pivotable via a rotating shaft in the wing structure portion, and is adapted to cover the inlet port, and the inlet-side drive mechanism is adapted to drive the second lid member so as to be opened toward a front side in a flight direction of the aircraft.

5. The hydraulic apparatus for aircraft actuators according to claim 1, further comprising:

an inlet-side drive mechanism to drive the inlet port opening/closing portion to be opened and closed; and an exhaust-side drive mechanism to drive the exhaust port opening/closing portion to be opened and closed, wherein the electric motor, the inlet-side drive mechanism, and the exhaust-side drive mechanism operate in accordance with a command signal from a control surface control apparatus that controls operation of the control surface.

6. The hydraulic apparatus for aircraft actuators according to claim 1, wherein the inlet port and the exhaust port are openable by the inlet port opening/closing portion and the exhaust port opening/closing portion operating at a timing at which the backup hydraulic pump is activated.

7. The hydraulic apparatus for aircraft actuators according to claim 1, further comprising:

a temperature sensor to detect at least one of a temperature of the pump unit, a temperature of air inside the wing, and a temperature of oil used as pressure oil supplied from the backup hydraulic pump, wherein the inlet port and the exhaust port are openable by the inlet port opening/closing portion and the exhaust port opening/closing portion operating in accordance with a result of detection performed by the temperature sensor.

\* \* \* \* \*